United States Patent
Williams

(10) Patent No.: US 9,335,218 B2
(45) Date of Patent: May 10, 2016

(54) DIGITAL IMAGING BOLOMETER AND METHOD OF MEASURING PHOTON RADIATION IN A PIXELATED IMAGE

(71) Applicant: Raytheon Company, Waltham, MA (US)

(72) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 151 days.

(21) Appl. No.: 14/312,338

(22) Filed: Jun. 23, 2014

(65) Prior Publication Data

US 2015/0369670 A1    Dec. 24, 2015

(51) Int. Cl.
  *G01J 5/20*    (2006.01)
  *G01J 5/24*    (2006.01)
  *G01J 5/00*    (2006.01)

(52) U.S. Cl.
  CPC .... *G01J 5/20* (2013.01); *G01J 5/24* (2013.01); *G01J 2005/0077* (2013.01); *G01J 2005/202* (2013.01)

(58) Field of Classification Search
  CPC .................... G01J 2205/208; G01J 2205/202; G01J 2205/0077; G01J 5/20; G01J 5/24; G01J 5/0853
  USPC ............................................ 250/336.1, 338.1
  See application file for complete search history.

(56) References Cited

U.S. PATENT DOCUMENTS

| | | | | |
|---|---|---|---|---|
| 5,584,117 A * | 12/1996 | Lee | ............................ | G01J 3/26 216/16 |
| 5,629,521 A * | 5/1997 | Lee | ............................ | G01J 3/26 250/338.1 |
| 7,145,143 B2 * | 12/2006 | Wood | .................... | G01B 11/272 250/339.04 |
| 7,622,717 B2 * | 11/2009 | Skidmore | ......... | H01L 27/14601 250/338.1 |
| 7,881,495 B2 * | 2/2011 | Williams | ................. | F41G 7/007 250/316.1 |
| 8,314,769 B2 * | 11/2012 | Cole | ........................ | G01J 5/046 250/338.1 |
| 2008/0055583 A1 * | 3/2008 | Lecomte | .............. | G01B 11/162 356/32 |
| 2010/0213375 A1 * | 8/2010 | Loeffler | ..................... | G02F 1/39 250/339.07 |
| 2012/0006971 A1 * | 1/2012 | Pflibsen | ............. | H01L 27/14634 250/208.1 |

OTHER PUBLICATIONS

Shie et al., "Analysis of optimal bolometer sensitivity with linear approximation," Institute of Electro-Optical Engineering, National Chiao Tung University 1001 Ta Hsueh Road, Hsinchu, Taiwan, R.O. C., SPIE vol. 2746, Downloaded From: http://spiedigitallibrary.org/ on Apr. 1, 2013, pp. 113-121.

(Continued)

*Primary Examiner* — David Porta
*Assistant Examiner* — Djura Malevic
(74) *Attorney, Agent, or Firm* — Eric A. Gifford

(57) ABSTRACT

A digital bolometer architecture provides dynamic control of a simultaneous integration time for all pixels, with a temporal response that is more uniform than conventional bolometers and lacks frame cross-talk from decay tails, and which supports sub-frame measurement for on readout computational imaging. This is accomplished by replacing resistive pixel temperature sensing with continuous optical interferometric measurement and subsequent signal accumulation. Balanced reference sensors allow rejection of temperature differences across the thermal sink. The thermal time constant of the pixels is substantially reduced and the lost SNR is recovered by integration of the measured signals, using a programmable integration time.

20 Claims, 7 Drawing Sheets

(56) References Cited

OTHER PUBLICATIONS

Takhar et al., "A New Compressive Imaging Camera Architecture using Optical-Domain Compression," Department of Electrical and Computer Engineering, Rice University, Copyright 2006 Society of Photo-Optical Instrumentation Engineers.

Watson et al., "Introduction to interferometry with bolometers:" The University of Manchester, Paris Jun. 19, 2008.

* cited by examiner

DIGITAL IMAGING BOLOMETER AND METHOD OF MEASURING PHOTON RADIATION IN A PIXELATED IMAGE

BACKGROUND OF THE INVENTION

1. Field of the Invention

This invention relates to imaging bolometers, in particular imaging bolometers that operate without cryogenic cooling to reduce cost, size, weight and power.

2. Description of the Related Art

Imaging bolometers, particularly those that operate without cryogenic cooling, are desired in many imaging applications to reduce cost, size, weight, and power. Such devices collect photons from different points in an outside scene (as imaged on the detector by forward optics), convert these photons to heat in the individual pixels, then sense that heat to measure the image signal. In a typical configuration, each bolometer pixel comprises a micro-machined (MEMS) structure, sometimes referred to as a "bridge", with legs that physically and thermally isolate the photo-absorptive region of the pixel from an underlying thermal sink. Absorbed photons heat the isolated portion of the pixel. In the most common configurations, this heat is sensed electrically using thermo resistance. The pixel is made from a material with a significant change in electrical resistance vs. temperature, such as Vanadium Oxide (VOX). An electrical current is run through the pixel to sense the resistance, generally running through the same legs that isolate the absorptive structure from the thermal sink. While the performance of such devices has been improving markedly over time, this structure imposes certain inherent limitations.

Unlike with photo-electric (PE) detectors, where the charge created by incoming photons is electrically integrated in a capacitor within each pixel, integration in bolometer pixels is mechanical. Absorbed photons produce heat and that heat is integrated in the thermally isolated part of the pixel. The better isolated the pixel is from the thermal sink (the larger the resistance to heat flow through the supporting legs), the better the signal to noise ratio. However, this is inevitably coupled with slower response to changing inputs (an increase in the effective time constant of the device).

To some extent, PE detectors face the same trade: the longer the integration time, the better the signal to noise ratio (within the limits of the signal integration). But, this trade is much more limiting and constrained for bolometers.

For PE detectors, integration time can be changed electrically, as shown in FIG. 1, by altering the interval over which the measured signal is integrated between some lower 100 and upper 102 limits. The trade between temporal response and sensitivity can be adjusted dynamically. Furthermore, PE detectors have a well defined finite integration time . . . with nearly no response to photons collected before the start of the integration interval, and nearly uniform gain for photons arriving at different times 104 during the interval. (Sub-frame integration techniques alter this, somewhat, but the time response is still nearly uniform when compared to a bolometer.)

In typical infra-red (IR) PE detectors, all pixels are all sampled at the same time. The integration time is adjustable, but the defined integration interval is the same shape and ends at the same time for every pixel in the array. This is referred to as a "snap-shot" readout.

Hence, the temporal response of each PE pixel can be expressed as a flat finite-impulse-response (FIR) filter. Each pixel approximates a uniform-weighted integral of the incoming flux over a programmable and finite integration time that is no larger than the frame time . . . and which may be very much smaller.

"Integration time" has no exact meaning in a bolometer. The nearest equivalent is the detector time constant. It is common, although quite incorrect, to use these terms interchangeably. The time constant of a bolometer specifies how quickly the heat produced by an absorbed photon dissipates into the thermal sink, specifically, how quickly the relative temporal response 106 falls to 1/e 108, as shown in FIG. 1, where e is Euler's number approximately equal to 2.718. Unlike with electrically integrated detectors, the response does not go to zero over a finite time.

This time constant is set by the physical structure of the bolometer, specifically by the ratio of the thermal capacity of the integrator to the thermal resistance of the supporting legs. This ratio, and hence the time constant, cannot be adjusted during use. Integration to improve SNR is purely mechanical, integrating heat within this structure, so the detector cannot adapt to changing scene conditions.

Typical bolometer pixels "integrate" continuously, so that the temporal response for each pixel is anchored to (ends at) the time at which that pixel is sampled: that is, the temporal response is measured backward from the readout time. FIG. 1 shows the response of a single pixel, sampled at time=1 frame. But, as shown in FIG. 2, typical bolometers sample pixels as they are read out during the frame interval 200, so that the temporal responses for pixels sampled near the end of the frame 202 and for pixels sampled near the front of the frame 204 are shifted with respect to reach other. This is sometimes referred to as a "rolling readout".

The temporal response of each bolometer pixel can be expressed as an exponentially decaying infinite-impulse-response (IIR) filter. Each pixel output approximates a fixed (non programmable) exponentially weighted integral of the incoming flux over an infinite integration time, which extends into previous image frames.

Another bolometer trade has to do with the duration of the sense current used to measure the temperature of each pixel. The heat absorbed by each pixel is measured as a thermally-induced change in resistance, by applying a sense current. But, passing a current through the resistance creates unintended heat, which then competes with the sensed signal. This unintended heat must be dissipated to maintain the temperature of the thermal sink. When the pixel resistance increases, the sense current adds even more unintended heat. In typical designs where the pixel resistance increases with temperature, this creates a positive feedback. Under some circumstances this can induce thermal run-away. Hence, it is advantageous to keep the sensing-current pulse short, and to measure the temperature only once per frame, relying entirely on thermal integration for SNR gain.

Some bolometers cancel common mode errors, such as thermal reference drift, by comparing the signals between pixels that are exposed to scene radiation to pixels that are not. In some cases, the scene radiation is masked temporally, using a shutter, so that the same pixels are compared across time. In others cases, some of the pixels are permanently masked, and comparisons are made between different pixels in the same frame.

Some bolometers narrow their spectral sensitivity by placing interferometric structures in front of the absorptive element (U.S. Pat. No. 5,584,117, U.S. Pat. No. 5,629,521 and U.S. Pat. No. 7,145,143 Wood). These structures act as adjustable narrow-band filters. But, unlike conventional interference filters, the spectral pass-band may be altered dynamically by adjusting the spacing between interferometric elements. As in other bolometers, the filtered light is absorbed and the resulting heat is electrically sensed as a change in resistance. The pixel temperature accumulation and measurement mechanism is completely conventional.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

A digital bolometer architecture provides dynamic control of a simultaneous integration time for all pixels, with a temporal response that is more uniform than conventional bolometers and lacks frame cross-talk from decay tails, and which supports sub-frame measurement for on readout computational imaging. This is accomplished by replacing resistive pixel temperature sensing with continuous optical interferometric measurement and subsequent signal accumulation. Balanced reference sensors allow rejection of temperature differences across the thermal sink. The thermal time constant of the pixels is substantially reduced and the lost SNR is recovered by integration of the measured signals, using a programmable integration time.

In an embodiment, a digital bolometer comprises a plurality of pixels configured to detect an image of a scene. Each pixel comprises an absorptive element configured to absorb radiation (e.g. IR or LWIR) from the scene, a thermal isolator connecting said absorptive element to a thermal sink, and a thermally sensitive optical phase shifter configured to phase shift a coherent measurement beam based on the temperature of the absorptive element. An interferometric temperature measurement device is configured to optically route the coherent measurement beam to and from the thermally sensitive optical phase shifter in each said pixel, mix a coherent reference beam with the phase shifted coherent measurement beam from each said pixel to detect a relative phase, and to accumulate the relative phase for each said pixel over a specified integration time as a measure of photon radiation. Readout logic is configured to provide the accumulated values for each pixel to external components.

In an embodiment, the design is configured so that the thermal time constant is reduced to a fraction of a frame interval, and the lost SNR is recovered by integration of the measured signals. The combination of integrating multiple samples with a reduced thermal time constant produces a more uniformly weighted temporal response. This response falls rapidly toward zero outside the signal integration time, greatly reducing frame-to-frame cross talk. And, since accumulation is no longer a purely a mechanical process, it may be dynamically adjusted. This allows dynamic trades of SNR vs. temporal smear and dynamic range, and allows adapting to the scene dynamic range.

In an embodiment, the design is configured so that the pixel thermal time constant is reduced to $<\frac{1}{2}$ of the frame interval. In another embodiment it is reduced to $<\frac{1}{10}$ of the frame interval.

In an embodiment, the absorptive element comprises a conventional bolometer absorptive material, such as VOX, that changes resistance with temperature. In another embodiment, the absorber comprises an absorptive material, such as micro textured silicon, that is not characterized by a change in resistance over the range of pixel operating temperatures that would make be required for a conventional bolometer.

In an embodiment, an integrated detector chip comprises at least those components other than the measurement and reference beam sources, the phase detectors, and the subsequent accumulators and readout.

In an embodiment, the reference beam passes through a reference phase shifter, aiding cancellation of changes in the thermal sink temperature. This reference phase shifter may be shared between all pixels, or groups of pixels, or separate for each pixel so that variations in temperature across the thermal sink are also cancelled.

In an embodiment, the reference beam may be created by placing a beam splitter in the measurement beam.

In an embodiment, a controllable modulator may be placed in the reference beam, so that the path may be modulated to guarantee some minimum phase cycle rate in order to minimize accumulated quantization error. In an alternative embodiment, this accomplished using a reference source operating at a slightly different frequency. In another alternative embodiment, these approaches are mixed.

In an embodiment the optics guiding the measurement beam through the pixel phase modulator and into the phase detector may be configured as integrated optical waveguides integral to the detector chip. In an alternative embodiment, the measurement beam may be routed via optics external to the detector chip.

In an embodiment the phase shifter comprises a waveguide manufactured from a material with a thermally sensitive index of refraction. In an alternative embodiment the phase shifter comprises an optical element, such as a ring resonator, with a structured configured to change phase delay in response to temperature or thermal expansion, possibly via shifting of a resonance peak.

In an embodiment the phase detector may provide a digital output, consisting of 2 or more bits, to the subsequence phase accumulation logic. In an alternative embodiment the phase measurement and accumulation may be analog.

These and other features and advantages of the invention will be apparent to those skilled in the art from the following detailed description of preferred embodiments, taken together with the accompanying drawings, in which:

DETAILED DESCRIPTION OF THE INVENTION

Imaging bolometers are desired as a lower cost/size/weight alternative to cryo-cooled PE infra-red detectors. But, as previously indicated, this cost reduction comes with other undesirable differences.

The temporal response of each bolometer pixel can be expressed as an exponentially decaying infinite-impulse-response (IIR) filter. That is, each pixel output approximates a fixed (non programmable) exponentially weighted integral of the incoming flux over an infinite integration time. This integration time extends into previous image frames. Pixels across the frame are sampled at different times, which is known as a rolling readout.

These bolometer behaviors are well known. However, the consequences, of these behaviors in some applications are generally neither well understood nor well handled. Behaviors that have no significant effect when imaging a static scene from a fixed position (which is a typical condition for tests and demonstrations), can seriously degrade performance in more stressing conditions. This generally low level of understanding is exacerbated by historical momentum, because operational differences that have no effect in testing typical PE detectors, due to the well-constrained integration time, are critical for bolometers.

Figure 3:
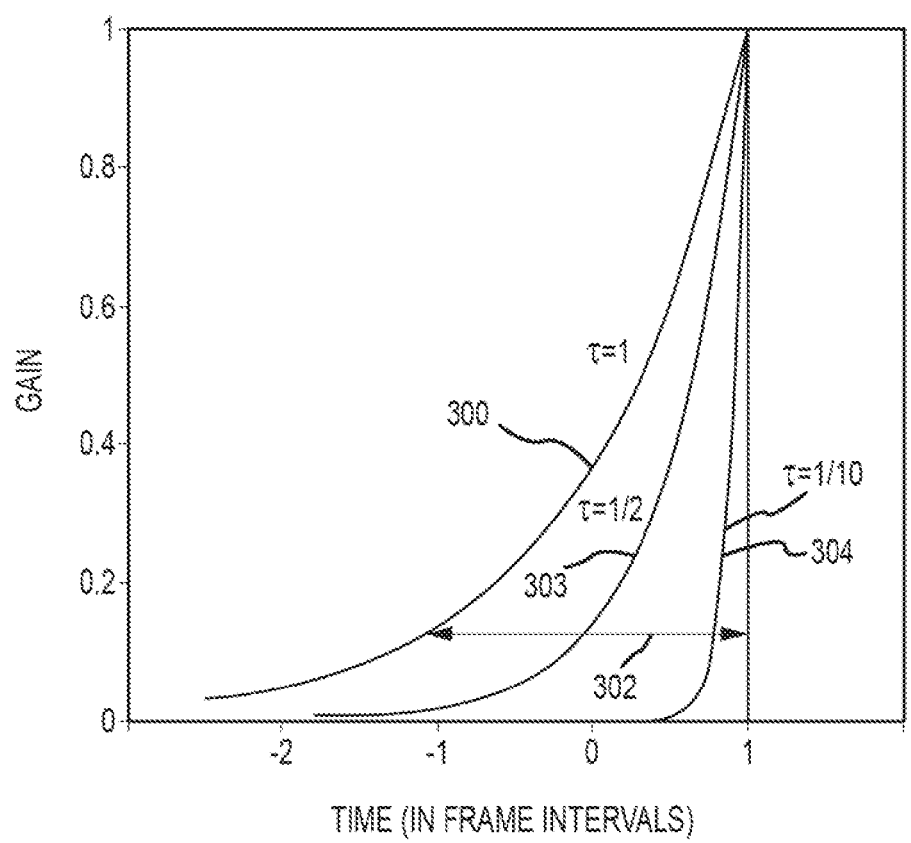
FIG. 3 is a plot of pixel relative gain versus photon arrival time for different time constants as a fraction of a frame.

Since bolometer temporal response has infinite tails, an "integration interval" can only be defined by determining (explicitly or implicitly) some level at which the response tail will be ignored. The detector "time constant" defines this interval for a cutoff gain of 1/e relative to the peak. FIG. 3 shows a temporal response 300 for a typical bolometer in which the time constant is equal to the frame time. The temporal response retains a lot of energy from the previous frame. The 1/e cutoff is completely arbitrary in terms of what any given system can tolerate. A more sensible cutoff for any given context should be determined by test and analysis. Picking a more conservative cutoff, of perhaps 10%, more than doubles the perceived integration interval 302. That is, with typical time constants (equal to the frame), an impulse applied to the pixel more than two frames ago may "ghost" into the current frame at more than 10% of it's initial energy.

It is tempting to suggest reducing the response tails (and the consequent ghosting) by reducing the pixel thermal time constant. But, this destroys SNR and exacerbates temporal sampling problems. FIG. 3 shows the effect of reducing the time constant $\tau$ from 1 frame 300, to ½ frame 303, to 1/10 frame 304. At 1/10 frame, most of the signal received during the frame interval is lost. Without some mitigation, not available in the existing art, such short time constants are not viable.

Another issue is the rapid exponential fall off of the bolometer pixel time response. For any reasonable cutoff level, the bolometer response exponential decay will discard a large fraction of the incoming signal as compared to a FIR PE detector with the same cutoff time. The bolometer also provides much less attenuation for temporal frequencies that are aliased at the frame sample rate.

In typical non-cryogenic applications, the thermo-resistive pixel temperature readout of existing bolometers leaves no flexibility to solve these problems. The reasons have already been discussed: sensing the pixel temperature multiple times per frame adds heat to the pixel, which competes with the signal and degrades SNR.

Another issue is the bolometer rolling readout that causes pixels at different positions in the array to be sampled at different times. As the time constant gets shorter, the reduction in temporal correlation between samples exacerbates aspects of this problem. But even with a typical bolometer time constant, the rolling readout can be a major problem. For one example, closing a high performance control loop around a tracked object using an imaging sensor requires a good understanding of the measurement latency. But, with a rolling readout the latency changes with the object position in the image.

All of these factors pose severe limitations for computational imaging. In a computational imager, each point in the scene image is reconstructed computationally, from combinations of the detector pixels, sometimes over multiple frames. In conventional cameras individual pixels correspond to individual areas in the scene, and the image temporal characteristics at the detector are determined by the scene and the stability of the platform. In contrast, computational imagers intentionally spread points from a scene across multiple sensor pixels, spread energy from multiple points in the scene across multiple pixels, shift the scene across the detector, temporally modulate the optical path. This causes the mapping from the scene to detector pixels to change rapidly with time, or otherwise disrupts the traditional imaging model. Detector pixels no longer correspond to points in the scene, and may change at rates far faster than the scene content. Dharmpal Takhar et. al, "A New Compressive Imaging Camera Architecture using Optical-Domain Compression", Proceedings of Computational Imaging IV at SPIE Electronic Imaging, pp. 43-52, 2006 provides an extreme example, where a single pixel observes rapidly modulated combinations of points across the entire scene.

As one would imagine, such approaches quickly fall apart when frame pixels are not sampled at the same time or when there is frame-to-frame cross talk. Hence, conventional bolometers are generally unsuitable for computational imaging applications. This is problematic since both bolometers and computational imaging are being looked to for improving system cost/capability trades. Bolometers are currently used in some computational imaging demonstration systems, but this is made possible by accepting limitations that are not viable in many real systems.

As in the development of early PE focal plane arrays, most of these problems are currently masked by other deficiencies of current bolometers. As bolometer performance improves, and as they are applied to more stressing applications, these issues will surface again, providing increased motivation for the present invention.

To summarize, existing bolometer designs electrically measure pixel absorber temperatures via electrical resistance, restrict readout intervals to limit induced heat, integrate photons entirely mechanically as heat in a pixel absorptive element, have a photon response that decays exponentially vs. time, accept frame cross-talk (due to exponential decay tails) as limited by the SNR trade, control a fixed SNR vs. temporal response trade via the absorber thermal time constant, and have a rolling readout where the pixel sample time changes with position in a frame.

The present invention uses interferometric temperature measurement to measure the heat absorbed in each pixel as a measure of photon radiation. This provides an alternate approach to building a bolometer with capabilities similar to those of existing bolometer designs. The interferometric design also provides a foundation that opens a new design space to add unique capabilities that overcomes the above limitations of existing bolometer designs; providing capabilities that currently exist only in PE detectors.

Figure 4:
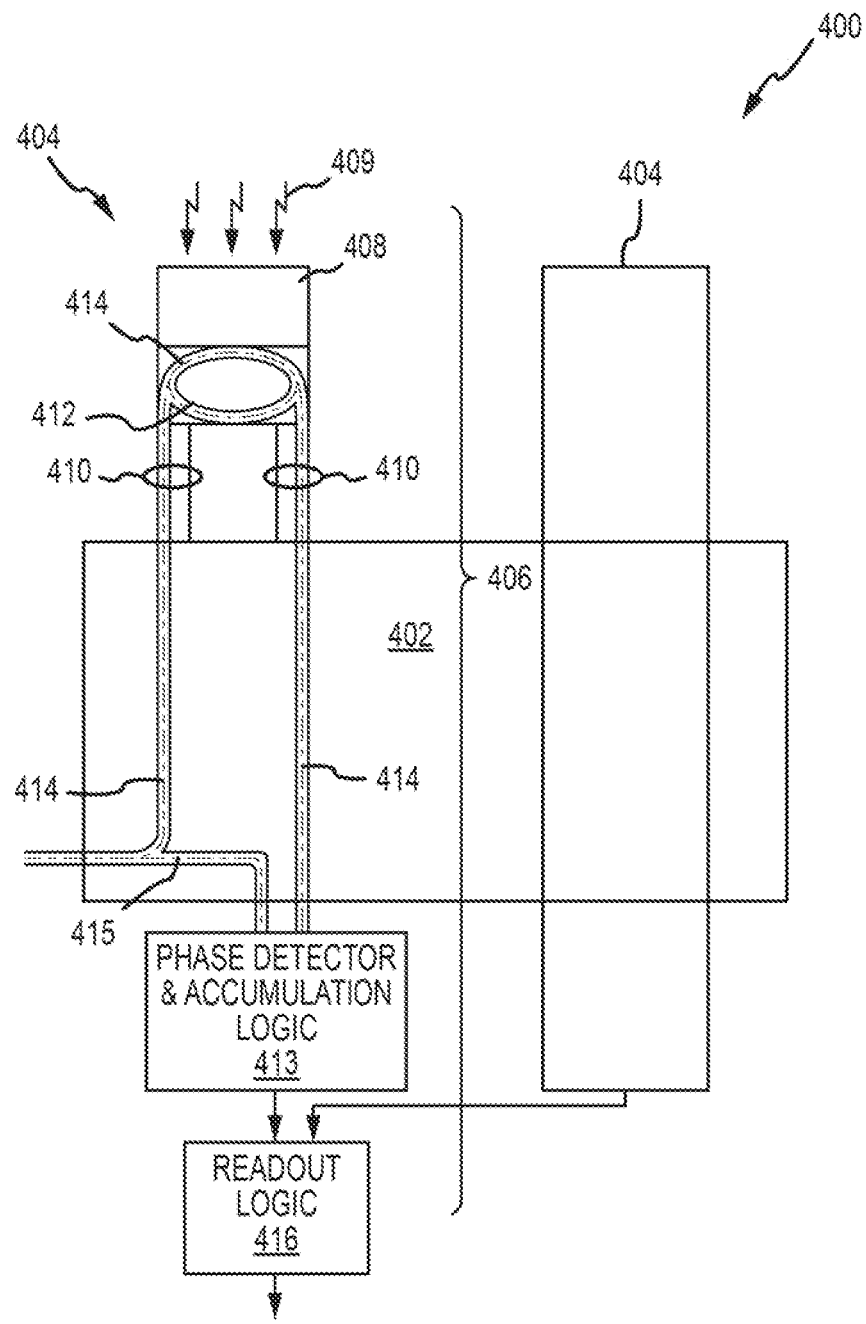
FIG. 4 is a schematic diagram of an embodiment of a single pixel of a digital bolometer using interferometric techniques to measure photon radiation.

Referring now to FIG. 4, an embodiment of a digital bolometer 400 for imaging a scene comprises a thermal sink 402, a plurality of pixels 404 and an interferometric temperature measurement device (ITMD) 406 configured to measure pixel temperature as a measure of photon radiation. Each pixel 404 comprises an absorptive element 408 configured to absorb radiation in the form of incoming photons 409 from the scene, a thermal isolator 410 connecting the absorptive element to the thermal sink and a thermally sensitive optical phase shifter 412 configured to phase shift a coherent measurement beam 414 based on the temperature of the absorptive element. The absorptive element 408 mechanically integrates the absorbed photons as heat. This heat produces a difference in temperature from thermal sink 402, which increases with the incoming photon flux and decreases inversely with the thermal resistance of thermal isolator 410.

Interferometric temperature measurement device 406 is configured to optically route the coherent measurement beam 414 to and from the thermally sensitive optical phase shifter 412 in each pixel. Phase detector and accumulation logic 413 mixes a coherent reference beam 415 with the phase shifted coherent measurement beam from each pixel to detect a relative phase and accumulates the relative phase for each pixel over a specified integration time as a measure of photon radiation. In some embodiments it is advantageous to use measurement and reference beam sources that are substantially outside the absorption band of the pixel absorptive element.

Readout logic 416 is configured to provide the accumulated values for each pixel to external components. The readout logic may be integrated on the same chip as the pixels and interferometric device or may be provided on a separate chip.

The digital bolometer may use existing bolometer absorber materials, such as VOX for long wave IR. However, it also opens the design space to allow other options. PE detectors require materials that absorb photons and convert them to moving charges, so that the photons may be measured via this current. The second constraint, to produce charges with adequate mobility, increases the challenge of producing adequate materials. Similarly, bolometers require materials that absorb photons as heat, and have a large change in electrical resistance vs. temperature, so this heat may be measured as an measure of the incoming photons. The present invention frees the absorber from the requirement for thermally sensitive resistance. Conventional materials such as VOX may be used, but also other absorbers, ones that do not have significant thermally varying resistance, or which are not electrically conductive . . . as long as photons are absorbed as heat. In particular, this decoupling of the design space may prove enabling for the use of sub-wavelength thickness absorbers . . . that would facilitate configurations with lower time constants. It may also enable the use of micro textured absorbers that might be unsuitable for PE detectors due to low electron mobility. As one example, the material selected for the phase-sensitive ring resonator, possibly silicon, might be micro textured to produce an IR absorber. This design freedom is not generally available when constraint for PE effects of thermo resistance must by simultaneously satisfied.

Interferometric measurement of the pixel temperatures provides the foundation for additional capabilities, capabilities that currently exist only in PE detectors. These capabilities may include ability to dynamically select between one or more of integration times (controlled via signal accumulation), substantially uniform integration weight vs. arrival time for integrated photons, negligible cross-talk (decay tails) between frames, simultaneous integration of pixels within a frame (snap-shot) and measurement of pixel values at greater than the frame rate for on-readout processing.

These capabilities are provided via a variety of alternate embodiments that build upon the foundation provided by the optical interferometric architecture. Specifically, the digital bolometer may be configured to implement one or more of the following: measure absorber temperature at much higher than the frame rate and integrate the measurements to improve frame SNR, integrate photons partially mechanically and partially as measured signals, flatten the overall temporal response through uniform signal integration, limit frame cross talk by limiting mechanical integration, independent of frame SNR, allowing dynamic trade of SNR vs. temporal response by controlling the length of the signal integration, and allow snap-shot readout, where all pixels are measured at the same time Interferometric measurement of the pixel temperatures is the foundation that makes all of this possible. It does so partly by reducing the heat dissipated into each pixel while measuring its temperature. This allows measurements to be performed at sub-frame rates (even continuously). This in turn frees signal accumulation from being a purely mechanical process; the mechanical integration of heat may be supplement with integration of the measured signal to recover or boost SNR. This allows the thermal time constant to be reduced without sacrificing SNR: it allows the SNR lost through exponential decay in current bolometers to be recovered. It also enables advanced capabilities such as on-readout processing.

The combination of integrating multiple samples with a reduced thermal time constant produces a much more uniformly weighted temporal response. This response falls rapidly toward zero, greatly reducing frame-to-frame cross talk. And, since accumulation is no longer a purely a mechanical process, it may be dynamically adjusted. This allows dynamic trades of SNR vs. smear, and allows adapting to the scene dynamic range.

Interferometric pixel temperature measurement also enables snap-shot integration by eliminating barriers to measuring all of the pixel temperatures at the same time. Snap-shot vs. rolling readout out becomes controllable via control of the signal integration.

Figure 5:
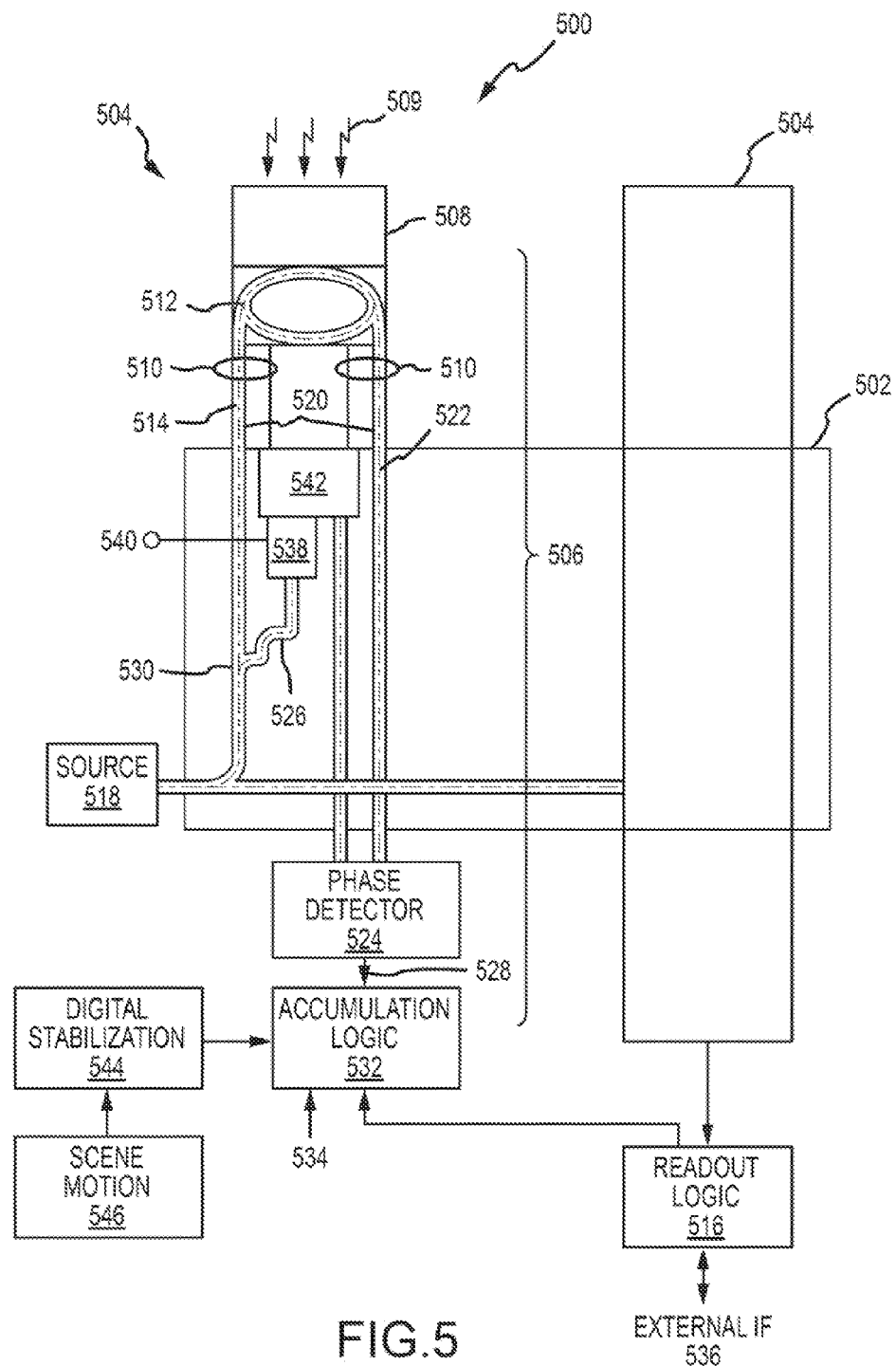
FIG. 5 is a more detailed schematic diagram of an embodiment of a digital bolometer using interferometric techniques to measure photon radiation.

Referring now to FIG. 5, an embodiment of a digital bolometer 500 for imaging a scene comprises a thermal sink 502, a plurality of pixels 504 and an interferometric temperature measurement device 506 configured to measure pixel temperature as a measure of photon radiation. Each pixel 504 comprises an absorptive element 508 configured to absorb radiation in the form of incoming photons 509 from the scene, a thermal isolator 510 connecting the absorptive element to the thermal sink and a thermally sensitive optical phase shifter 512 configured to phase shift a coherent measurement beam 514 based on the temperature of the absorptive element.

Interferometric temperature measurement device 506 is configured to optically route the coherent measurement beam 514 to and from the thermally sensitive optical phase shifter 512 in each pixel, mix a coherent reference beam 514 with the phase shifted coherent measurement beam from each pixel to detect a relative phase, and to accumulate the relative phase for each pixel over a specified integration time as a measure of the photon radiation.

Readout logic 516 is configured to provide the accumulated values for each pixel to an external interface. The readout logic may be integrated on the same chip as the pixels and interferometric device, or may be provided on a separate chip. The readout is generally configured to sample and output a frame of pixels at a time, with a "frame interval" between the start of one frame and the next. In a given system this frame interval may be fixed, may change during operation, or may be indefinite as frames are sampled and output based on some external signal. Similarly, each frame may sample all or a defined subset of the detector pixels, and the subset may be changed as desired. This is often referred to as a "windowing" readout.

The thermal mass of the absorptive element 508 and thermal resistance of thermal isolator 510 set the thermal time constant of the pixel. Ordinarily the thermal time constant is set to a nominal value equal to the typical frame interval (it cannot adjust to follow changes in the frame interval). In the preferred embodiment, the resistance of the thermal isolator is substantially decreased, reducing the thermal time constant of the pixel integrator by a factor of 2 or more, typically more than 10 to a fraction of the frame rate as shown in FIG. 3. As a result, measurements are made at rates greater than the frame rate. This is done to cut the tails of the exponential decay that otherwise cause frame cross-talk. In a conventional bolometer, this would unacceptably degrade SNR. In the present invention, the short time constant is supported by subsequent integration of the signal measurements. The combination of both mechanical integration and signal integration provides a more uniform temporal response over the integration time, allows dynamic control of the integration time, and restores SNR. SNR may actually be boosted by providing a more uniform photon response over a frame interval.

Interferometric temperature measurement device 506 receives coherent measurement beam 514 from a coherent source 518, which may or may not be part of the device. The coherent measurement beam 514 is routed via pixel guiding optics 520 (suitably an integrated waveguide) into optical phase shifter 512 that shifts the phase of the beam in accordance with the pixel temperature. In this embodiment, the phase shifter is implemented using a ring resonator where the resonance peak shifts with temperature.

The phase shifted measurement beam 522 is then routed via pixel guiding optics 520 to a phase detector 524 that mixes it with a coherent reference beam 526 to detect a relative phase 528. As shown, source 518 feeds a coherent beam to a beam splitter 530 that splits the beam to form the coherent reference beam 526 and the coherent measurement beam 514. As shown, the beam splitter is integrated into the waveguide with the pixel guiding optics. Since the reference beam does not pass through the phase shifter 512, the phase detector 524 measures the shift induced by the pixel temperature. In the preferred embodiment, the measured relative phase 528 is represented as a two-bit digital electrical signal, corresponding to the SIGN of the in-phase and quadrature (I/Q) components of the relative phase of the measurement and reference beams. This allows subsequent logic to distinguish between forward and backward phase shifts, allowing a correct integration of delta-phase over multiple cycles, extending the shifter dynamic range.

Accumulation logic 532 integrates the phase 528 over an integration time determined by an integration control input 534. This is used to derive a measure of the integrated pixel temperature, hence photonic radiation 509 over the integration time. The readout logic 516 passes these measures for each pixel in the current output frame to an external interface 536.

In some implementations, the configuration thus far discussed would suffer from severe quantization in the measured relative phase signal 528. This quantization error would be amplified over time when integrated in the accumulation logic 532. In order to avoid this, the signal is manipulated to assure that I/Q SIGN transitions occur with at least a predetermined frequency, so that more accurate phase may be inferred. This may be accomplished by inserting a controllable phase modulator 538 into the reference path, which inserts a known shift determined by a modulator control signal 540. This control signal may be fed to the accumulation logic so that its effects may be removed from the resulting integration while preserving the effective decorrelation of the quantization error so that it may be averaged out. In another embodiment, the minimum I/Q rate is assured by replacing the split reference beam at a slightly different frequency at the second coherent source insertion point at the input to the phase modulator 538. The difference frequency between the sources guarantees a minimum rate. These two approaches may be used individually, or in combination. Additionally, the embodiment includes a reference phase shifter 542 that corrects for thermal drift in the thermal sink 502. This causes the phase detector to more precisely measure the temperature difference between the pixel and it's immediate thermal connection to the thermal sink 502.

This approach cancels interference before the pixel temperature is converted to an electrical signal. A single measurement of relative phase is made from the combined measurement and reference beams: measurement beam and reference beam photons remain entangled at the quantum level until the measurement is made. Optical phase delay is compared, rather than electronic signals.

An alternative embodiment may modify the accumulation to provide for digital stabilization 544 which may be done via in-readout processing. Scene motion inputs 546 estimate the motion of the scene across the pixel grid, and are used to cause the same point in the image to sum into the same accumulator, even though that input does not always come from the same pixel. The mechanisms for accomplishing this are discussed in detail in U.S. Ser. No. 14/064,161 filed Oct. 27, 2013.

Figure 1:
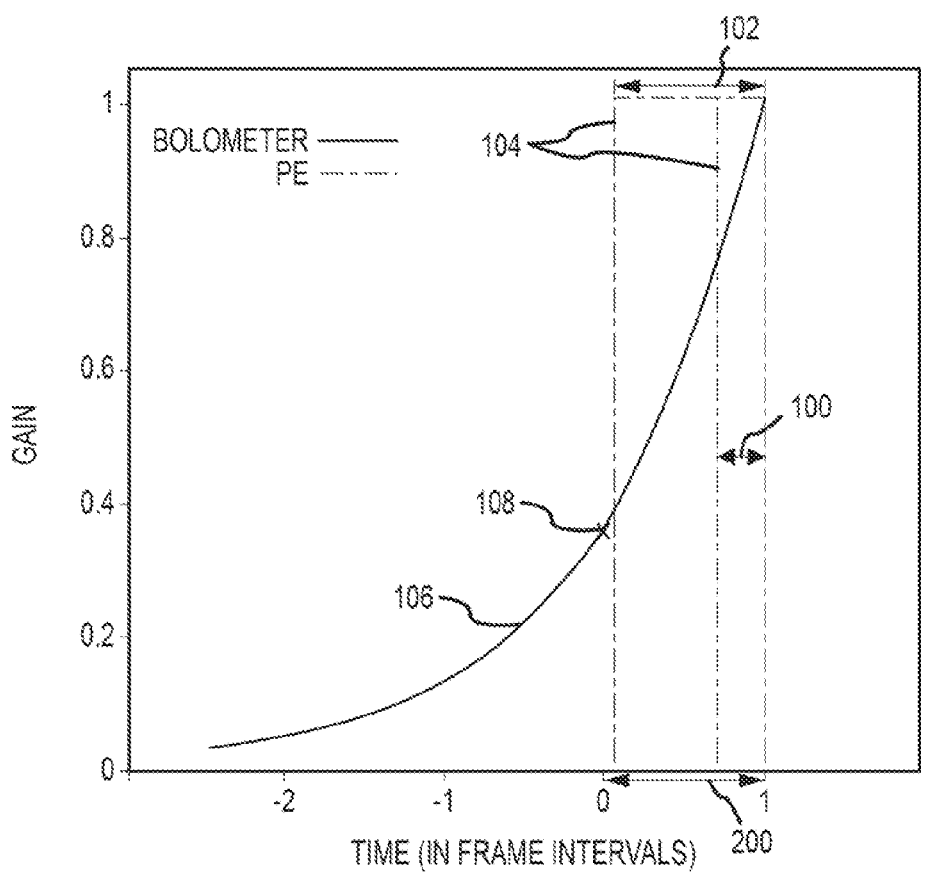
FIG. 1, as described above is a plot of relative photon response for a PE detector and an imaging bolometer.
Figure 2:
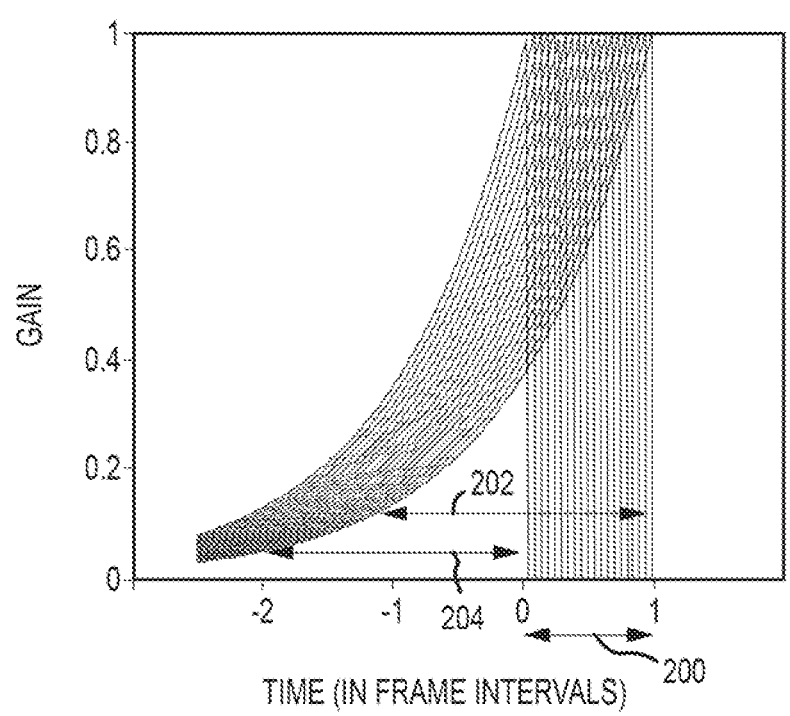
FIG. 2, as described above, is a plot of pixel relative gain versus photon arrival time for a rolling readout in a typical imaging bolometer.
Figure 6A:
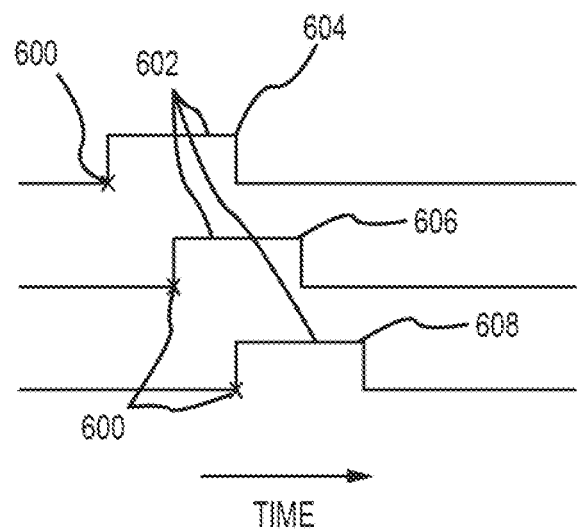
FIGS. 6a and 6b are diagrams of different embodiments for phase accumulator resets and integration periods.
Figure 6B:
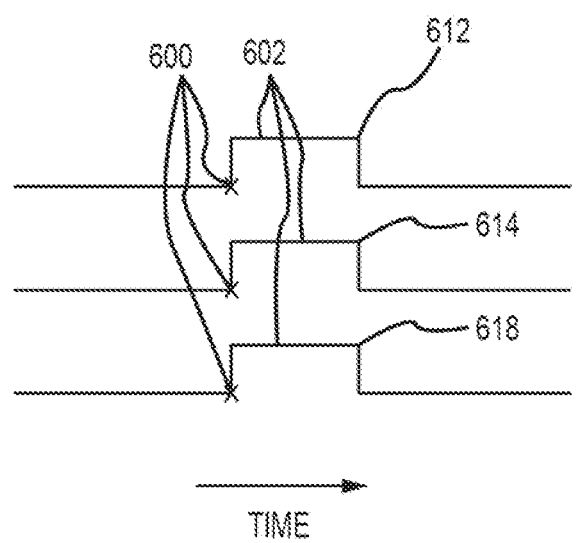

The integration control signal 534 may be configured to operate the detector in different ways. As shown in FIG. 6a, the accumulator resets 600 and integration periods 602 for pixels at the start 604, middle 606, and end 608 of a frame occur at different times. This produces a conventional rolling-readout as shown in FIG. 2, but without the usual severe exponential shaping of the time response curve.

Figure 7A:
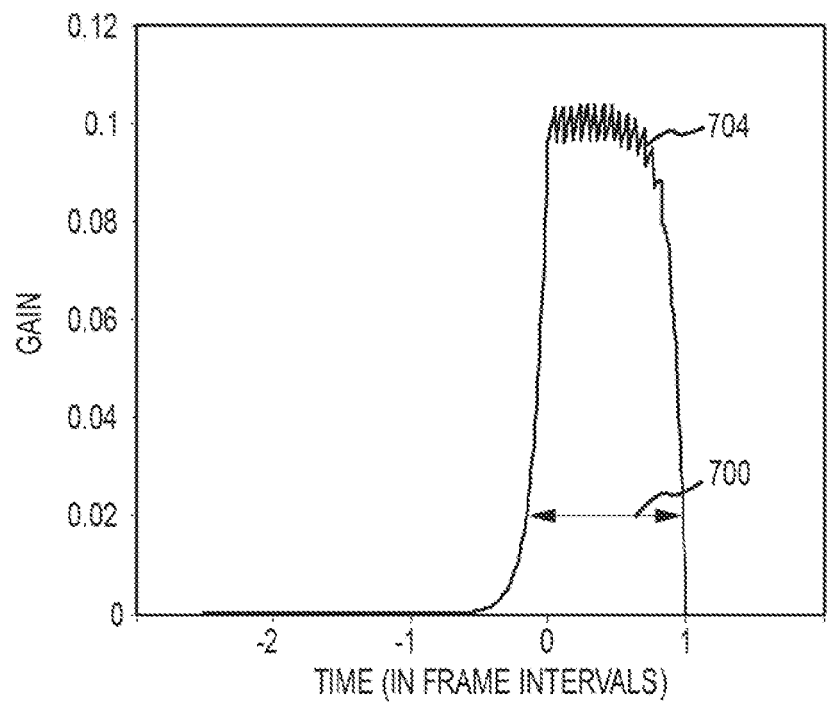
FIGS. 7a and 7b are plots of pixel relative gain versus photon arrival time illustrating the effect of adding signal integration over a full frame time or half the frame time, respectively.
Figure 7B:
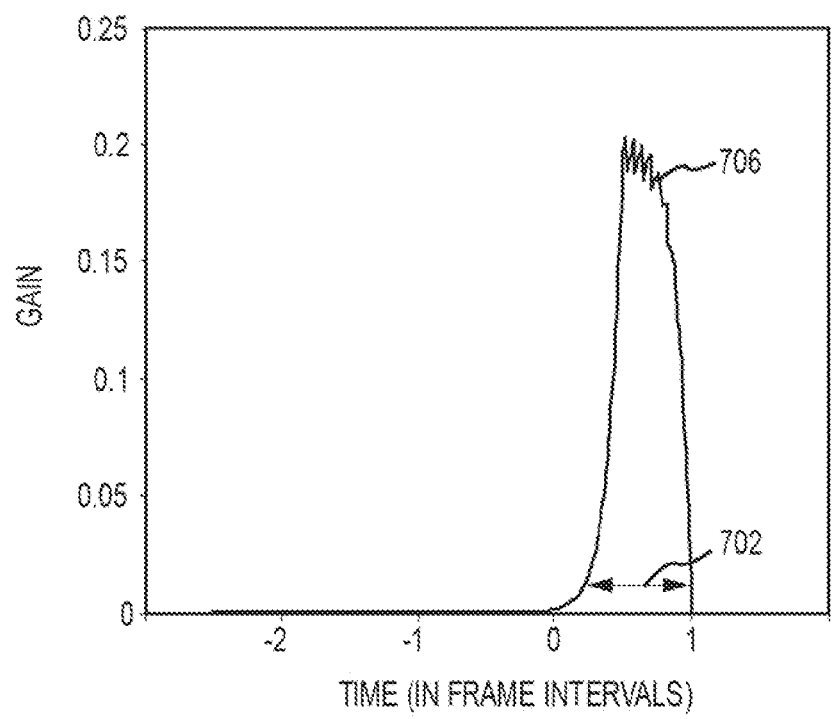

In another embodiment the integration control signal 534 is configured as shown in FIG. 7b so that the accumulator resets 600 and integration periods 602 are concurrent for pixels at the start 612, middle 614, and end 616 of the frame . . . in fact, for all pixels. This is referred to as a snap-shot readout.

Unlike in a conventional bolometer, the overall temporal response of each pixel depends not only on the pixel thermal time constant, but also on the commanded integration time and the sample rate over that integration. For example, FIG. 3 shows the response 304 of just the thermal portion for the pixel when the time constant is reduced to ¹⁄₁₀ frame. Most of the potential signal outside a brief time 304 is lost, and the peak response occurs in a very narrow time window that falls off very rapidly.

FIGS. 7a and 7b show the effect of adding subsequent signal integration over a full frame time or half the frame time, respectively. Note that the effective period of integration in the first case 700 is slightly longer than the frame time. Similarly, the effective integration time 702 in the second case is somewhat longer than the commanded accumulation. This is due to the thermal time constant. Hence, it is generally preferable to set a maximum integration time limit that is somewhat lower than the frame interval. Note that the temporal response 704 is remarkably uniform compared to a conventional bolometer, even at ½ frame time "integration" 706. This has the consequence of providing greater overall photon gain than any reasonable time constant for a purely mechanical integration.

It is generally desirable for the interval between pixel temperature samples over the integration time to be somewhat less than the thermal time constant. As the sample interval decreases, the "hash" shown in the temporal response 704, 706 flattens out. In some embodiments the effective sampling is continuous, accumulating phase transitions as they occur. Since the thermal time constant induces correlation between samples, there is a point of diminishing returns for improving SNR that depends on the relative contribution of different noise sources in any particular system.

In summary, this digital bolometer architecture provides dynamic control of integration time, with a temporal response that is more uniform than conventional bolometers and which lacks frame cross-talk from response decay tails. It also allows sub-frame measurement for computational imaging methods such as electronic stabilization. This is accomplished by replacing resistive pixel temperature sensing with continuous optical interferometric measurement. Balanced sensors may be included to allow rejection of temperature differences across the thermal sink. The thermal time constant of the pixels is substantially reduced and the lost SNR is recovered by integration of the measured signals, using a programmable integration time. Together, these features fix many of the problems that render bolometers impractical in dynamic and computational imaging applications, opening the trade space to enable a new generation of low cost high performance systems.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A digital bolometer, comprising:
   a thermal sink;
   a plurality of pixels configured to detect an image of a scene, each said pixel comprising an absorptive element configured to absorb radiation from the scene, a thermal isolator connecting said absorptive element to said thermal sink, and a thermally sensitive optical phase shifter configured to phase shift a coherent measurement beam based on the temperature of the absorptive element; and
   an interferometric temperature measurement device configured to optically route the coherent measurement beam to and from the thermally sensitive optical phase shifter in each said pixel, mix a coherent reference beam with the phase shifted coherent measurement beam from each said pixel to detect a relative phase, and to accumulate the relative phase for each said pixel over a specified integration time as a measure of photon radiation.

2. The digital bolometer of claim 1, wherein the measurement device is configured for read out of the accumulated relative phase of said pixels to output a frame of pixels at a time at a frame interval,
   wherein a thermal mass of the absorptive element and a thermal resistance of the thermal isolator combine to determine a thermal time constant of said pixel less than said frame interval, and
   wherein the accumulated relative phase comprises the accumulation of multiple relative phase measurements over the specified integration time in each said frame.

3. The digital bolometer of claim 2, wherein the thermal time constant is less than ½ the frame interval.

4. The digital bolometer of claim 2, wherein the integration times for all pixels within a frame are substantially identical in length and concurrent.

5. The digital bolometer of claim 1, wherein said interferometric temperature measurement device is configured to adjust said integration time.

6. The digital bolometer of claim 1, wherein said coherent reference beam is at a first frequency and the coherent measurement beam is at a second frequency different than said first frequency to reduce accumulated quantization noise.

7. The digital bolometer of claim 1, wherein said interferometric temperature measurement device comprises for each pixel a digital phase detector that measures relative phase with a quantization error and a controllable phase modulator configured to induce a known incremental phase difference into the measured relative phase to reduce accumulated quantization noise.

8. The digital bolometer of claim 1, wherein said interferometric temperature measurement device comprises for each pixel a digital phase detector that measures relative phase, each said digital phase detector comprising a two big digital I/Q sensor, wherein the measurement device is configured to count positive or negative phase changes based on the time sequence of these bits.

9. The digital bolometer of claim 1, where said interferometric temperature measurement device is configured to receive estimates of scene motion across the pixels and apply that estimated scene motion to the measured relative phases such that different pixels imaging the same portion of the image scene over time are accumulated to the same accumulated relative phase output.

10. The digital bolometer of claim 1, where said interferometric temperature measurement device further comprises one or more reference phase shifters configured to shift the phase of said reference beam in response to the temperature of the thermal sink at one or more local areas of the thermal sink.

11. The digital bolometer of claim 1, wherein said interferometric temperature measurement device further comprises for each said pixel a reference phase shifter configured to shift the phase of said reference beam in response to the temperature of the thermal sink at that pixel.

12. The digital bolometer of claim 1, wherein said interferometric temperature measurement device comprises pixel guiding optics to route the coherent measurement beam to and from each pixel, a phase detector configured to mix the reference and measurement beams and an accumulator to integrate the relative phase, wherein at least the thermal sink, absorptive element, thermal isolator, optical phase shifter, pixel guiding optics and phase detector are integrated on a single chip.

13. The digital bolometer of claim 1, wherein the absorptive elements comprise a material with a resistance that is substantially constant over the operating temperature range of the pixel.

14. A digital bolometer, comprising:
    a thermal sink;
    a plurality of pixels configured to detect an image of a scene, each said pixel comprising an absorptive element configured to absorb radiation from the scene, a thermal isolator connecting said absorptive element to said thermal sink, and a thermally sensitive optical phase shifter configured to phase shift a coherent measurement beam based on the temperature of the absorptive element;
    an interferometric temperature measurement device configured to optically route the coherent measurement beam to and from the thermally sensitive optical phase shifter in each said pixel, mix a coherent reference beam with the phase shifted coherent measurement beam from each said pixel to detect a relative phase, and to accumulate the relative phase for each said pixel over a specified integration time as a measure of photon radiation; and readout logic configured to read out the accumulated relative phase of said pixels to output a frame of pixels at a time at a frame interval, wherein a thermal mass of the absorptive element and a thermal resistance of the thermal isolator combine to determine a thermal time constant of said pixel less than ½ said frame interval, and wherein the accumulated relative phase comprises the accumulation of multiple relative phase measurements over the specified integration time in each said frame.

15. The digital bolometer of claim 14, wherein the integration times for all pixels within a frame are substantially identical in length and concurrent.

16. The digital bolometer of claim 14, wherein said interferometric temperature measurement device is configured to adjust said integration time.

17. A method of measuring photon radiation in a pixelated image using plurality of pixels each comprising an absorptive element configured to absorb radiation from a scene and a thermal isolator connecting the absorptive element to a thermal sink, said method comprising for each pixel:

phase shifting a coherent measurement beam based on a temperature of the absorptive element;

mixing the phase shifted coherent measurement beam with a coherent reference beam to detect a relative phase;

accumulating the relative phase over a specified integration time as a measure of photon radiation.

18. The method of claim 17, further comprising:

configuring the measurement device for read out of the accumulated relative phase of said pixels to output a frame of pixels at a time at a frame interval;

setting a thermal mass of the absorptive element and a thermal resistance of the thermal isolator combine to determine a thermal time constant of said pixel less than said frame interval; and accumulating multiple relative phase measurements over the specified integration time in each said frame as the accumulated relative phase.

19. The method of claim 18, wherein the integration times for all pixels within a frame are substantially identical in length and concurrent.

20. The method of claim 17, further comprising adjusting said integration time.

\* \* \* \* \*